United States Patent [19]

Piazza

[11] 4,307,889

[45] Dec. 29, 1981

[54] APPARATUS UTILIZING ROTARY MOTION OF A MEMBER AS THE MOTIVE FORCE FOR A PUMP

[75] Inventor: Andre L. Piazza, Houston, Tex.

[73] Assignee: NL Industries, Inc., New York, N.Y.

[21] Appl. No.: 115,436

[22] Filed: Jan. 25, 1980

[51] Int. Cl.[3] .......................... F16J 15/40; F01C 1/10

[52] U.S. Cl. .......................................... 277/3; 175/107; 308/187; 417/310; 418/48

[58] Field of Search .............. 417/310; 418/48; 277/3; 175/106, 107; 308/187

[56] References Cited

U.S. PATENT DOCUMENTS

| | | | |
|---|---|---|---|
| 1,892,217 | 12/1932 | Moineau | 418/48 |
| 3,600,109 | 8/1971 | Paulichenke et al. | 417/297.5 |
| 3,740,057 | 6/1973 | Doyle | 277/3 |
| 3,888,495 | 6/1975 | Mayer | 277/3 |
| 3,894,818 | 7/1975 | Tschirky | 418/48 |
| 4,039,229 | 8/1977 | Ohlberg | 308/187.1 |
| 4,080,115 | 3/1978 | Sims et al. | 418/48 |

*Primary Examiner*—Richard E. Gluck

*Attorney, Agent, or Firm*—Arnold, White & Durkee

[57] ABSTRACT

An arrangement for minimizing the pressure differential across shaft seals is characterized by a pump powered by the rotative force of a shaft to pump a fluid from a reservoir chamber into a chamber next-adjacent to each shaft seal. When the pressures in the chambers adjacent to the seals exceed a predetermined magnitude, a pressure relief arrangement is opened, thus venting the chambers and maintaining the differentials across the seals as minimal as possible.

18 Claims, 4 Drawing Figures

30 134U 32 183 124 135 142 141A B 136C-1 127 A 131B 129O' 140 180 162 159A 157 182 10 28 134L 20 136U 143 133 136C 152 174 158A 148A 148 141B 147 129I' 131A 150 160 159B 158 12 136C 136L 134L 30
134U
32
183
124
136U
143
148A
135
148
142
141A
141B
B
148A
147
136C-1
129"I"
127
A
131A
131B
129"0"
133
150
140
180
136C
160
162
159B
159A
158
157
152
174
158A
182
134L
12
10
CL
28
134L
20
136U
B
A
136C
136L
134L

APPARATUS UTILIZING ROTARY MOTION OF A MEMBER AS THE MOTIVE FORCE FOR A PUMP

BACKGROUND OF THE INVENTION

1. Field of the Invention

This invention relates to apparatus which utilizes the rotary motion imparted to a member as the motive force for a pump.

2. Description of the Prior Art

It is well-known in the art that the magnitude of the pressure differential across a seal between a stationary and a relatively rotatable member increases the forces imposed on the seal and commensurately reduces the operating life thereof. This is especially true in the hydrocarbon drilling environment where seals are typically used on various downhole tools.

U.S. Pat. No. 3,600,109 (Pavlichenko, et al.) relates to an arrangement to seal the shaft of a drilling face machine. U.S. Pat. No. 3,894,818 (Tschirky) relates to an in-hole motor in which thrust bearings are provided with means to lubricate the bearings employing pressure balanced seals.

Other sealing arrangements between a relatively rotating shaft and a stationary housing are those disclosed in U.S. Pat. No. 3,740,057 (Doyle, et al.), U.S. Pat. No. 3,888,495 (Mayer) and U.S. Pat. No. 4,080,115 (Sims, et al.).

U.S. Pat. No. 4,039,229, issued to Ohlberg discloses a roller bearing construction which includes at least one bounding wall fabricated of an elastic material. U.S. Pat. No. 1,892,217, issued to Moineau discloses a gear mechanism adapted for use as a pump, a prime mover or a fluid transmission means.

Until very recently, some downhole tools, more particularly turbodrills, have been used to drill oil wells with thrust bearings constructed from laminations of rubber and steel. Lubrication and cooling were provided by the drilling mud circulating in the well bore. Their poor performance in such environment compelled designers, engineers and operators to shift to standard bearings (balls, rollers, etc.) operating in a clean lubricant. This required sealing off the chamber housing the bearings system from any intrusion of contaminants present in the drilling mud and the mud itself.

The duration of efficient operation depends on the life of the bearings, among other factors, and in turn the life of the bearings depends on the life of the seals separating the clean lubricant from the drilling mud.

A significant factor controlling the life of these seals is the differential pressure across them. Reducing the pressure differential across these seals using a modified roller bearing as prime mover for a pump is considered to be a feature of the present invention.

It would be advantageous to utilize the rotary motion necessarily imparted to a downhole tool as the motive force for a pump. Further, it is believed to be advantageous to provide a seal arrangement for use in the hydrocarbon production environment wherein the motive force generated by the rotation of the shaft is imparted to a bearing member and is utilized to pump lubricating fluid between internal chambers to thereby equalize pressure differences across the shaft sealing members. Also believed advantageous as a consequence of the pumping of lubricating fluid between internally defined chambers is the circulation of the lubricating fluid so that a heat transfer relationship between the fluid and the structural members may be provided to lower bearing operating temperatures. It is also advantageous to generate the higher pressures of the fluid on the "inside" of the seals to insure that any leakage flow tends to be in a direction from the inside to the outside, thus effectively isolating the region between the seals from the region outside the seals.

SUMMARY OF THE INVENTION

This invention relates to an apparatus which utilizes the rotary motion of a downhole member as the motive force for a pump so that a pressure differential may be generated to isolate a component from a particular region. In particular, the invention relates to an apparatus for minimizing the pressure differential across the seals between a housing and a shaft relatively rotatable with respect thereto. The seals define an interior region in which a bearing, as a roller bearing, is disposed for supporting the rotation of the shaft with respect to the housing. The bearing and the first seal cooperate to define an interior chamber within the region. A member, as a floating piston, is disposed between the opposite side of the bearing and the second seal to define second and third chambers within the interior region. Means for communicating the first and third chambers, as a channel defined within the structure of either the shaft or the housing, is provided so that a pressure increase in the first chamber is applied to the fluid in the third chamber. A pressure relief arrangement, biased by a predetermined force, opens to vent the third chamber when the pressure of the fluid in the third chamber exhibits a magnitude which exerts a force exceeding the biasing force. The relief arrangement may take the form of a fluid conduit disposed in the floating piston. The conduit has a valve arrangement disposed therein. The valve may be a check valve biased by a spring toward the closed position.

Mounted on the roller bearing is a suitable pump, as a Moineau pump. Motive force for the pump is provided by the rotation of the shaft. The pump responds to the rotation of the shaft imparted to the roller bearing to pump lubricating fluid from the second chamber into the first chamber to increase the fluid pressure therein. The fluid pressure also increases within the third chamber as a consequence of the disposition of the channel. When the pressure within the first and the third chambers exceeds the predetermined level, the pressure generates a force acting against the biasing force of the check valve. When the force exerted by the pressure of the fluid in the third chamber exceeds the predetermined biasing force imposed on the check valve the valve opens, thus relieving the pressure in the first and third chambers. If the biasing force imposed on the check valve is set slightly below a desired pressure level in the third (and thereby the first) chamber, the pressures in those chambers may be selected and maintained such that a minimum pressure differential is defined across the first and second seal.

BRIEF DESCRIPTION OF THE DRAWINGS

The invention will be more fully understood from the following detailed description thereof, taken in connection with the accompanying drawings, which form a part of this application and in which.

DESCRIPTION OF THE PREFERRED EMBODIMENT

Figure 1:
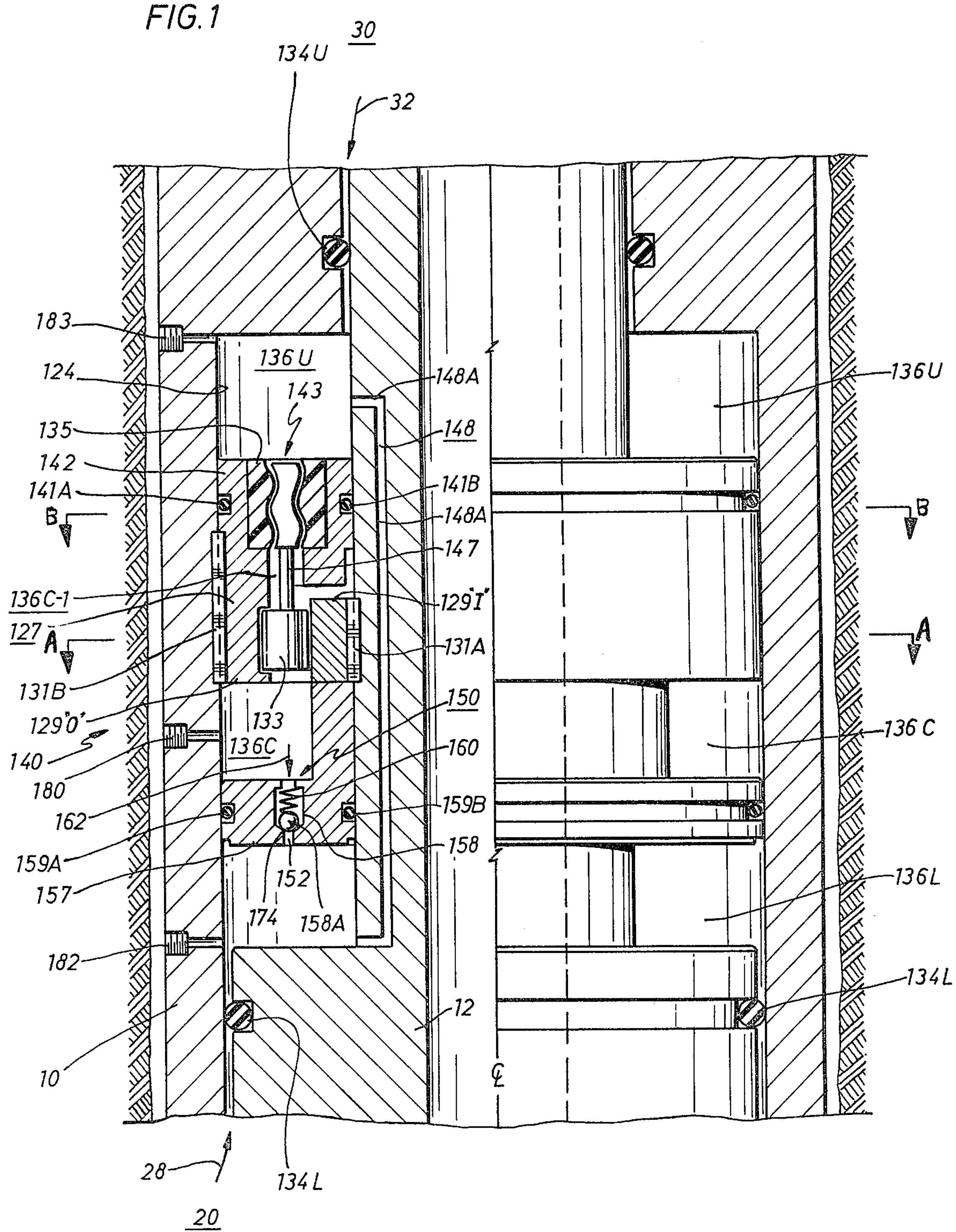
FIG. 1 is a side elevational view entirely in section illustrating an apparatus for minimizing pressure differential across a shaft seal in accordance with the instant invention.
Figure 2:
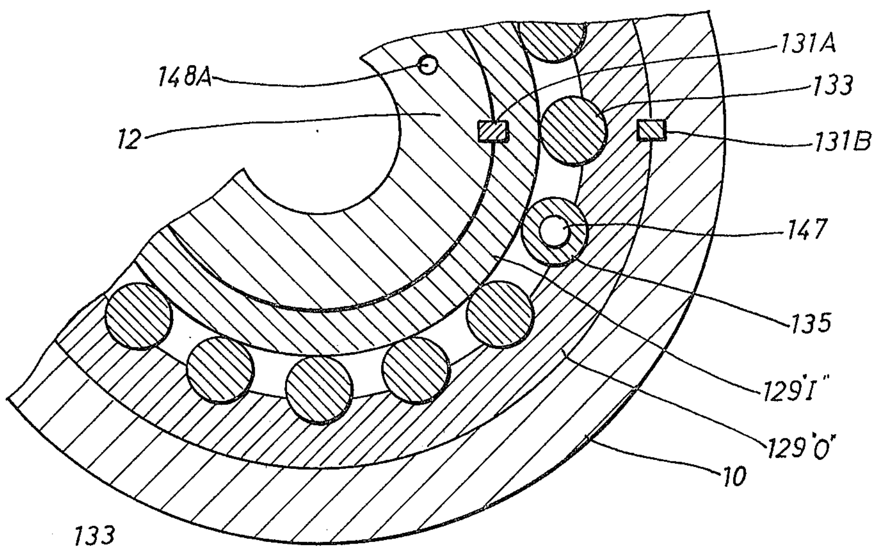
FIG. 2 is a partial cross-sectional view taken through section lines A—A in FIG. 1.

Referring now to FIG. 1, shown in side elevational view is an arrangement generally indicated by reference character 140 for minimizing the pressure differential across a first upper seal 134U and a second lower seal 134L. The seals 134U and 134L are disposed between a stationary housing 10 and a rotatable shaft 12 relatively rotatable with respect thereto. FIG. 1 illustrates the structure disposed with respect to an axial centerline CL it being understood that the structures defined are symmetrical with respect to that centerline CL and extends circumferentially around the shaft 12.

The shaft 12 may be any relatively rotatable member with respect to a housing 10, as for example, a turbodrill. The first and second seals 134U and 134L, respectively, may be any suitable shaft sealing arrangement utilized in the operating environment and are typically fabricated of suitable resilient material.

The first seal 134U and second seal 134L cooperate to enclose an annular space or interior region 136 between the housing 10 and this shaft 12. Region 136 is shown divided into three (3) sections 136U, 136C, and 136L. The housing 10 (or the shaft 12, or both) may be relieved to define a diametrically enlarged dimension as at 124, for the interior region 136.

Disposed within the interior region 136 is a bearing generally indicated at 127. As seen in FIG. 1 the preferred embodiment of the invention utilizes a roller bearing in which an inner race 129"I" is keyed (as by a key 131A) to the rotatable shaft 12. The outer race 129"O" of the bearing may be keyed (as by key 131B) or otherwise integrally installed as with a press fit into the housing 10. A plurality of roller elements 133 are supported between the inner race 129"I" and the outer race 129"O" in order to define the bearing surfaces on which relative rotation of the shaft 12 with respect to the housing 10 is permitted. To facilitate rotation the entire interior region 136 is provided with a suitable lubricating fluid, as lubricating oil.

Figure 3:
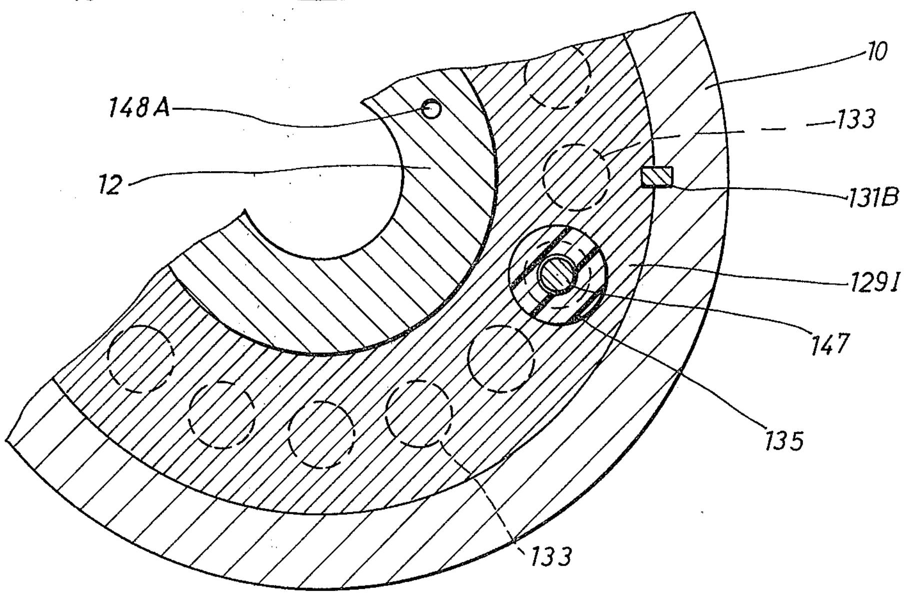
FIG. 3 is a partial cross-sectional view taken through section lines B—B in FIG. 1.

Mounted between the housing and shaft in the vicinity of the bearing 127 is a rubber stator 135. The stator 135 and its support ring 142 may be formed integral with outer race 129 "O", see FIG. 1. Suitable seals 141A and 141B, as O-ring seals, may be disposed as shown between the housing and shaft, respectively. The rubber stator 135 is an annular member, see Section "BB" (FIG. 3).

A pump, generally indicated by 143 includes a shaft 147 connected to any one of the roller elements 133. The end of the shaft drives the pump 143. The pump may take the form of a Moineau pump which is received within the rubber stator 135. As will be seen the pump 143 is responsive to the motive force of the shaft 12 imparted to the bearing element 127 to provide a pumping action whereby pressure differentials across the first and second seals 134U and 134L may be minimized.

A first chamber 136U is defined above the bearing 127/pumps 143 and the first seal 134U.

Disposed in the space between the lower surface of the bearing 127 arrangement and the second seal 134L is a member, or floating piston 157. The piston 157 is an annular member provided with inner and outer seal rings 159A and 159B, respectively. The member, or floating piston 157 is operative to subdivide the portion of the interior region between the bearing 127 and the second seal 134L into a second chamber 136C and a third chamber 136L. The chamber 136C is further subdivided into a sub-chamber 136C-1 by the bearing 127. The second chamber 136C communicates with the sub-chamber 136C-1 defined between the bearing and stator. That is, although the first chamber 136U is isolated from the second chamber 136C, and the second chamber is isolated from the third chamber 136L, the second chamber 136C is to be construed to include the sub-chamber 136C-1 between the bearing 127 and the stator 135.

Means 148 for communicating the first chamber 136U with the third chamber 136L are provided. In the preferred embodiment, the means 148 take the form of a channel 148A provided in the structure of the shaft 12 so that the first chamber 136U and the third chamber 136L are in fluid communication. It is understood that although the channel 148A is shown as disposed within the rotating shaft 12 it may be disposed with equal effect within the housing 10.

A pressure relief arrangement 150 is provided for relieving the pressure in the third (and the first) chambers. The arrangement includes a conduit or bore 152 provided within the floating piston 157 and communicating the second chamber 136C with the third chamber 136L. It is likewise to be appreciated that the pressure relief arrangement may take any form whereby the third chamber (and the first chamber) may be relieved. For example, the channel 148A may be provided within the rotor 12 or the housing 10 in accordance with this invention.

The arrangement 150 includes a valve 158 provided in the conduit or bore 152. The valve element may take the form of a check valve having a ball 158A biased against a seat by a spring 160. The spring 160 exerts a force acting in the direction 162 urging the ball 158A toward the seat 174 to thereby interdict communication between the second and third chambers. As will be seen herein, the magnitude of the force imposed by the spring 160 is selected in accordance to a predetermined pressure magnitude which is desired to be present in the fluid within the first chamber 136U and in the third chamber 136L.

Since the second chamber 136C unrestrictedly communicates with the sub-chamber 136C-1, it may therefore be appreciated that the second chamber 136C serves as a fluid reservoir. Lubricating fluid is introduced into the second chamber 136C through a reservoir inlet port 180. Similarly, fluid is also provided to the third chamber 136L by a second inlet port 182. Air is vented through port 183. In operation, of course, both inlet ports 180 and 182 and vent port 183 are provided with suitable caps.

The operation of the invention may now be discussed. It is advantageous in order to extend the operating life of the seals 134U and 134L for as long a period as possible. To effect this end it is desirable to maintain the pressure in the chamber 136U above the pressure in the region 30 yet to maintain the pressure differential therebetween as low as possible. Similarly, it is desirable to maintain the pressure in the third chamber 136L above but as close as possible to the pressure of the region 20 beyond the second seal 134L so as to minimize the differential thereacross. In accordance with this invention an arrangement is provided whereby the pressure differentials across the first seal 134U and second seal 134L are minimized. Further, an arrangement is provided to positively maintain higher pressure in the first chamber 136U and the third chamber 136L than in the regions beyond the seals 134U and 134L.

Rotational motion of the shaft 12 is imparted to the bearing 127, including the roller elements 133. Consequently, the shaft 147 and thereby the pump 143 are rotated causing fluid to be pumped from the sub-chamber 136C-1 (and, therefore, from the reservoir or second chamber 136C) into the first chamber 136U.

The motive force for the pump is derived from the rotation of the shaft 12 which turns the bearing element 133 which turns the pump shaft. As a result of the pumping action of the Moineau pump the pressure $P_{136U}$ in the first chamber 136U increases. This pressure increase is also sensed as a result of the channel 148A as an increase in pressure $P_{136L}$ in the third chamber 136L. It is apparent that the pressure levels in the first chamber 136U and the third chamber 136L are substantially equal but separated only by the pressure drop of the channel 148. If the pressures in the first chamber 136U and therefore the third chamber 136L increase beyond a predetermined magnitude, the fluid in the third chamber 136L exerts a force on the ball 158A opposing the force acting in the biasing direction 162. When the force generated by the fluid in the third chamber 136L exceeds the biasing force, the valve 158 of the pressure relief arrangement opens and the third chamber 136L is in communication with the second chamber 136C. As a result, fluid is vented from the third chamber 136L into the reservoir or second chamber 136C thereby relieving the pressure levels in the third chamber 136L and the first chamber 136U.

By judiciously selecting the magnitude of the biasing force 162 acting on the valve 158 it may be readily understood that the magnitude of the pressures within the third chamber 136L and the first chamber 136U may be controlled. In this manner, the pressure differentials across the first seal 134U and the second seal 134L may be minimized with the attendant advantages in seal life resulting therefrom.

Also as a concomitant advantage it may be appreciated that the pumping of the lubricating fluid from the reservoir 136C and the sub-chamber 136C-1 associated therewith, through the first chamber 136U, the channel 148, the third chamber 136L, the channel 148A and thence back into the second chamber 136C provides a circulation path for the lubricating fluid which acts to decrease the operating temperature in the closed system so defined. Yet further, it is believed that since the seal rings 159A and 159B associated with the piston or member 157 are exposed only to circumferential rotating forces and are thus static in a vertical direction (as viewed in FIG. 1) the useful thereof is also enhanced. Further, by judiciously selecting the pump output, the pressure can be maintained at higher levels in the chambers 136U and 136L than in the regions 20 and 30. By judicious sizing of the chambers, the rate of leakage from the chambers 136U and 136L into the regions 20 and 30 may be accommodated, thus permitting a determination of the duration of safe operation.

Figure 4:
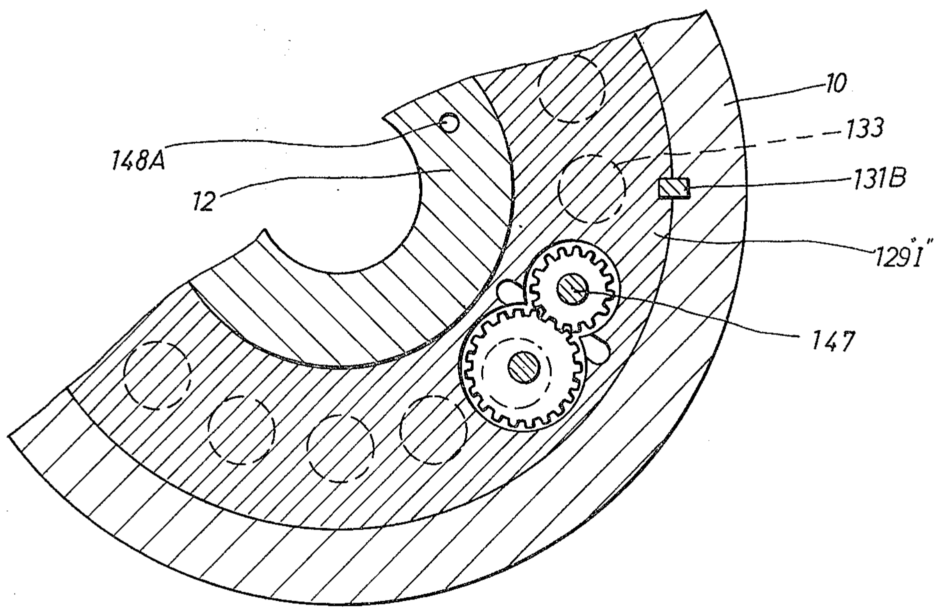
FIG. 4 is an alternative embodiment of the apparatus depicted in FIG. 3.

It is to be understood, of course, that a reservoir may be disposed elsewhere than the second chamber, so long as the second chamber communicates therewith. Further, the third chamber may be relieved directly into the reservoir so defined and remain within the contemplation of this invention. It is, however, believed advantageous to relieve the third (and first) chambers into the reservoir defined by the second chamber, in the manner discussed above. It is also to be understood that although the bearing is disclosed in the preferred embodiment as a roller bearing and the pump as a Moineau pump, the invention is not to be construed as so limited. It is to be understood that any mechanism whereby the rotation of the shaft is utilized to pump fluid from the reservoir (shown as the chamber 136C) into the first and third chambers 136U and 136L, respectively, lies within the contemplation of this invention such as a gear pump, see Section "BB", Alternative Design, FIG. 4.

In view of the foregoing it may be appreciated that the motive force for a pump derived from the rotation of the shaft may be utilized to circulate lubricating fluid from a reservoir and into the first and third chambers to thereby maintain the pressure differential across the first and second seals as minimal as possible. By judiciously selecting the magnitude of the biasing force imposed on the valve in the second channel it may also be appreciated that the pressure in the first and third chambers may be relieved so that the predetermined pressure levels desired therein may be maintained.

Having described the preferred embodiment of the invention those skilled in the art having benefit of the teachings of the instant invention as set forth hereinabove may effect numerous modifications thereto, which modifications are to be construed as lying within the scope of the invention as defined in the appended claims.

What is claimed is:

1. In apparatus of the type having a stationary member, a rotatable member disposed within the stationary member for rotary motion with respect thereto, an upper and a lower seal disposed at axially spaced locations between the rotatable and stationary members to define an interior region therebetween, a bearing to be isolated from regions above the upper seal and below the lower seal mounted to one of the members, the interior region being able to receive a fluid therewithin, wherein the improvement comprises:

a pumping element disposed in a driven relationship with the rotatable member, the pumping element being disposed intermediate the bearing and the upper seal, a piston element being disposed intermediate the bearing and the lower seal, the pumping element and piston element cooperating to subdivide the interior region into an upper, a lower and a central portion;

means for communicating the upper portion with the lower portion;

a pressure relief arrangement between one of the upper or lower portion and the central portion for relieving the pressure generated in a fluid disposable within the former portion into the latter portion when the pressure in the former portion exceeds a predetermined biasing force;

the pumping element being operable by the rotation of the rotatable member to pump a fluid disposed in the central portion into the upper and lower portions to maintain the pressure of the fluid in the upper and lower regions at a level greater than the pressure of a fluid in the region above the upper seal and in the region below the lower seal.

2. Apparatus according to claim 1 wherein the communicating means comprises a channel disposed within the rotatable member.

3. Apparatus according to claim 2 wherein the pressure relief arrangement includes a conduit disposed between the lower portion and the central portion, and a valve disposed in the conduit, the valve being biased to a position interdicting flow between the lower portion and the central portion.

4. Apparatus according to claim 1 wherein the pressure relief arrangement includes a conduit disposed between the lower portion and the central portion, and a valve disposed in the conduit, the valve being biased to a position interdicting flow between the lower portion and the central portion.

5. Apparatus according to claim 4 wherein the valve is a spring biased check valve.

6. In apparatus of the type having a housing, a shaft mounted on a bearing for rotation with respect to the housing, a first and a second seal respectively disposed between the shaft and the housing on opposite sides of the bearing to define an interior region able to contain a lubricating fluid therein, the bearing and the first seal defining a first internal chamber, a member disposed between the bearing and the second seal to define a second chamber between the bearing and the member and a third chamber between the member and the second seal, wherein the improvement comprises an arrangement for minimizing pressure differences across the first and second seals, said arrangement comprising:

- means for communicating the first chamber and the third chamber;
- a pressure relief arrangement for venting the third chamber and reducing the pressure in the first chamber when the pressure of the fluid within the third chamber exceeds a predetermined biasing force; and
- a pump responsive to motive force imparted thereto by rotation of the shaft to pump fluid from the second chamber to the first and third chambers, the pressure relief arrangement being responsive to the force exerted by the fluid in the third chamber so that when the pressure therein exceeds a predetermined magnitude the relief arrangement opens to vent fluid from the third chamber to the second chamber to minimize pressure differences across the seals.

7. Apparatus according to claim 6 wherein the bearing is a roller bearing and wherein the pump is a Moineau pump mounted on the bearing.

8. Apparatus according to claim 6 wherein the communicating means comprises a channel disposed within the shaft.

9. Apparatus according to claim 7 wherein the communicating means comprises a channel disposed within the shaft.

10. Apparatus according to claim 6 wherein the pressure relief arrangement includes a fluid conduit disposed between the second and third chambers, and a valve disposed in the conduit, the valve being biased to a position interdicting flow between the second and third chambers.

11. Apparatus according to claim 7 wherein the pressure relief arrangement includes a fluid conduit disposed between the second and third chambers, and a valve disposed in the conduit, the valve being biased to a position interdicting flow between the second and third chambers.

12. Apparatus according to claim 9 wherein the pressure relief arrangement includes a fluid conduit disposed between the second and third chambers, and a valve disposed in the conduit, the valve being biased to a position interdicting flow between the second and third chambers.

13. Apparatus according to claim 6 wherein the predetermined biasing force exerted on the pressure relief arrangement is less than the force generated by the predetermined magnitude of the pressure in the third chamber.

14. Apparatus according to claim 7 wherein the predetermined biasing force exerted on the pressure relief arrangement is less than the force generated by the predetermined magnitude of the pressure in the third chamber.

15. Apparatus according to claim 9 wherein the predetermined biasing force exerted on the pressure relief arrangement is less than the force generated by the predetermined magnitude of the pressure in the third chamber.

16. Apparatus according to claim 15 wherein the fluid conduit is disposed within the member and wherein the valve is a spring biased check valve.

17. Apparatus according to claim 11 wherein the fluid conduit is disposed within the member and wherein the valve is a spring biased check valve.

18. Apparatus according to claim 12 wherein the fluid conduit is disposed within the member and wherein the valve is a spring biased check valve.

* * * * *